Figure 1:
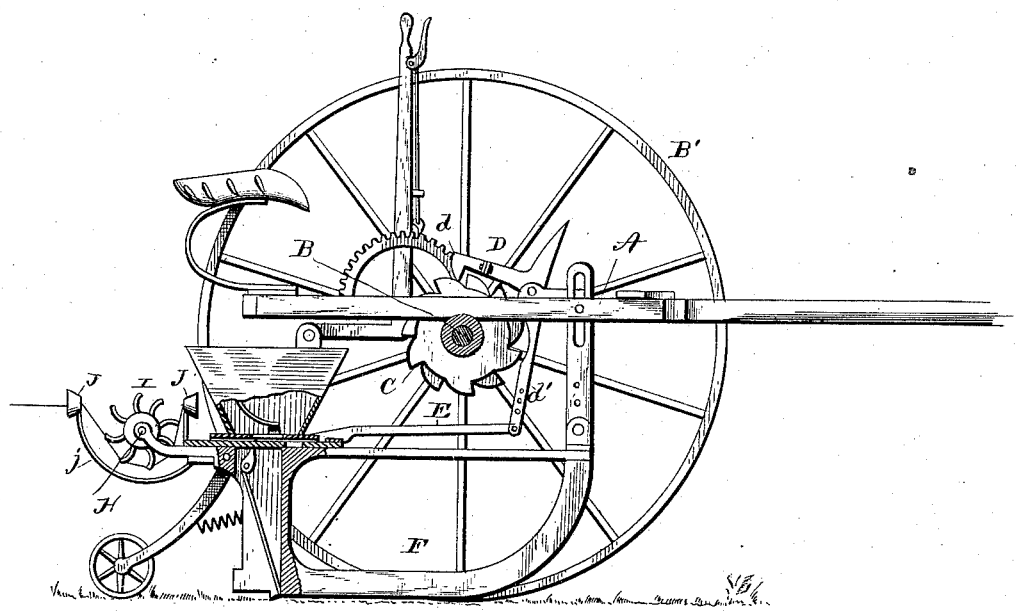

(No Model.)  2 Sheets—Sheet 1.

M. V. JORDAN & C. O. COLE.
CHECK ROW ATTACHMENT FOR CORN PLANTERS.

No. 335,075. Patented Jan. 26, 1886.

WITNESSES
F. L. Ouraud
E. W. Johnson

Martin V. Jordan
Cary O. Cole
INVENTORS

George E. Lemon
Attorney (No Model.) 2 Sheets—Sheet 2.
M. V. JORDAN & C. O. COLE.
CHECK ROW ATTACHMENT FOR CORN PLANTERS.
No. 335,075. Patented Jan. 26, 1886.
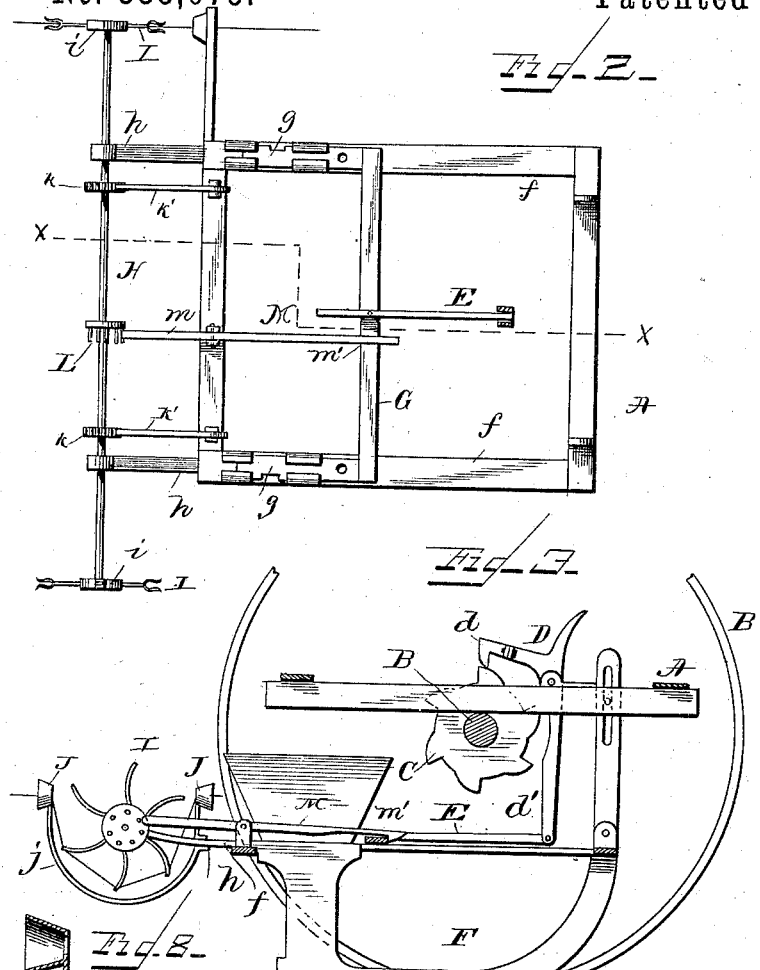
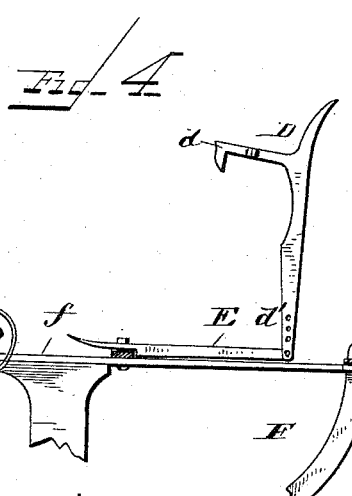
WITNESSES
F. L. Ourand.
E. W. Johnson
INVENTORS
Martin V. Jordan
and
Cary O. Cole
George E. Lemon
*Attorney*

UNITED STATES PATENT OFFICE.

MARTIN V. JORDAN AND CARY O. COLE, OF LETTS, IOWA.

CHECK-ROW ATTACHMENT FOR CORN-PLANTERS.

SPECIFICATION forming part of Letters Patent No. 335,075, dated January 26, 1886.

Application filed October 5, 1885. Serial No. 179,071. (No model.)

*To all whom it may concern:*

Be it known that we, MARTIN V. JORDAN and CARY O. COLE, citizens of the United States of America, residing at Letts, in the county of Louisa and State of Iowa, have invented certain new and useful Improvements in Check-Row Attachments for Corn-Planters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain new and useful improvements in check-row corn-planters, the object of the same being to provide a check-row attachment which can be applied to corn-planters which are constructed so as to operate the seed-slides by means of mechanism connected with the axle of the supporting-wheel, such a planter being described and illustrated in an application of an even date herewith; and our invention consists in a check-row mechanism which is constructed substantially as herein shown and described.

In the accompanying drawings, which illustrate our invention, Figure 1 is a side view of our improvement, showing the same applied to a planter. Fig. 2 is a plan view. Fig. 3 is a sectional view, and Fig. 4 is a detail sectional view taken on the line $x\ x$ of Fig. 2.

In the accompanying drawings, A represents the upper frame of a corn-planter, which is provided with a central axle, B, and supporting-wheels B'. The axle B is provided centrally with one or more cam-disks, C, with which engages a crank-lever, D, said crank-lever being pivoted to the main frame, so that when the axle is rotated the disk C will contact with the end of the crank-lever, (indicated by the letter $d$,) so as to oscillate the lower end, $d'$, of the same, so as to cause the bar E, which is pivotally attached to the same, to reciprocate, said bar engaging with the frame or cross-bar which carries the seed-slides.

The lower frame, F, consists, essentially, of a rectangular frame, $f$, beneath which are located the shoes and seed-spouts, the hoppers being located above said seed-spouts. A reciprocating frame, G, has attached thereto the seed-slides $g$, which move immediately under the hoppers. The frame $f$ has attached thereto rearwardly-extending arms $h$, the ends of which are formed into bearings for the reception of a transverse shaft, H, said shaft carrying at its ends, which are located beyond the wheels of the planter, disks $i$, with projecting forked arms I, with which engages the check-row cord, to which the tappets are secured. This check-row cord is guided into these forked arms by truncated cones J, which are carried by a semicircular frame, $j$, which is suitably attached to the frame in front of the disks $i$. By means of these truncated cones the check-row cord is guided into the forks, and as the planter is moved forward said cord will cause the forked disks to rotate, and thus revolve the shaft H. A backward movement of the shaft H is prevented by the ratchet-wheels $k$, which are rigidly secured to the shaft, said ratchet-wheels engaging with spring-pawls $k'$, which are pivotally connected to the rear cross-bar of the frame $f$.

The shaft H is provided near its central portion with a crown-wheel or pinion, L, which is rigidly attached to the same, and with the teeth thereof the end $m$ of the lever M engages, said lever being pivotally attached to the rear cross-bar of the frame. The front end of this lever is provided with a hooked end, $m'$, which engages with the cross-bar G, which carries the seed-slides.

The bar E, which is attached to the lower end, $d'$, of the crank-lever, is also attached to the cross-bar G, and the implement, when used as a check-row corn-planter, is operated as follows:

When the axle B is rotated, the cam or ratchet-disk C, contacting with the crank-lever D, oscillates the lower end of the same rearwardly, thus moving the frame, which carries the seed-slides $g$ rearwardly, in which position the said frame is held by the pivoted lever M, and at the proper time the forward end of this lever is raised by reason of the teeth of the crown-wheel striking upon the rear end of the same. By this construction it will be seen that the movement of the seed-slides is governed by the check-row mechanism, for when the latter is not actuated the end $m'$ of the lever M holds the slide-bar so that the lever D will be elevated out of engagement from the cam-wheel C, and consequently the dropping of the seed is suspended. When the check-row cord again actuates the check-row devices, the lever M releases the seed-slide bar, thereby permitting the lever D to drop by gravity and be vibrated by the cam-wheel to operate the seed-slides.

We claim—

1. In a check-row mechanism for corn-planters, a transverse shaft journaled in supports attached to the rear of a frame carrying the seed planting and dropping mechanism, said shaft being provided at its ends with forked disks, with which the tappet-cord engages, and centrally with a crown-wheel or pinion for vibrating a pivoted lever, M, so as to release the seed-dropping slides, substantially as shown, and for the purpose set forth.

2. In combination with a corn-planter provided with a central axle and means for reciprocating the seed-slides, a lever pivoted thereto, so as to hold said operating crank-lever out of gear so as to govern the movement of the seed-slides by a check-row line, substantially as shown, and for the purpose set forth.

3. In a check-row attachment for corn-planters, a shaft pivotally attached to the rear portion of the planter-frame and provided at its ends with forked disks, with which the check-row line engages, said shaft having pawls and ratchets $k$ $k'$ and a central crown-wheel, L, which engages with the end of the lever M, the parts being organized substantially as shown, and for the purpose set forth.

In testimony whereof we affix our signatures in presence of two witnesses.

MARTIN V. JORDAN.
CARY O. COLE.

Witnesses:
C. B. CARPENTER,
V. CHAMBERS.